US007374081B2

(12) United States Patent
Mosher, Jr.

(10) Patent No.: US 7,374,081 B2
(45) Date of Patent: May 20, 2008

(54) IDENTIFICATION DEVICE HAVING REUSABLE TRANSPONDER

(75) Inventor: Walter W. Mosher, Jr., West Hills, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 443 days.

(21) Appl. No.: 11/100,888

(22) Filed: Apr. 6, 2005

(65) Prior Publication Data

US 2005/0184874 A1 Aug. 25, 2005

Related U.S. Application Data

(63) Continuation-in-part of application No. 09/033,832, filed on Mar. 3, 1998.

(60) Provisional application No. 60/040,962, filed on Mar. 12, 1997.

(51) Int. Cl.
*G06K 5/00* (2006.01)

(52) U.S. Cl. ...................... 235/380; 235/385; 235/492; 340/572.8; 340/573.1

(58) Field of Classification Search ................ 235/380, 235/385, 492; 340/572.8, 573.1; 602/62; 368/10; 343/700, 718
See application file for complete search history.

(56) References Cited

U.S. PATENT DOCUMENTS 4,475,481 A * 10/1984 Carroll .................... 119/51.02
4,598,275 A * 7/1986 Ross et al. ............... 340/573.4
4,612,719 A * 9/1986 de Jong ....................... 40/658
4,718,374 A * 1/1988 Hayes ...................... 40/301 X
5,119,072 A * 6/1992 Hemingway ............. 340/573.1
5,140,946 A * 8/1992 Pennock et al. ............ 119/859
5,168,281 A * 12/1992 Tokunaga ................... 343/718
5,323,554 A * 6/1994 MacDonald ................. 40/633
5,343,608 A * 9/1994 MacDonald ................. 63/3 X
5,448,110 A * 9/1995 Tuttle et al. ................ 257/723
5,461,807 A * 10/1995 Johnson .................... 40/300 X
5,479,797 A * 1/1996 Peterson .......................... 63/3
5,588,234 A * 12/1996 de Jong et al. ............... 40/301
5,740,623 A * 4/1998 Juhan et al. .................. 40/633
5,986,566 A * 11/1999 Yamamori ................. 340/7.63

* cited by examiner

*Primary Examiner*—Michael G. Lee
*Assistant Examiner*—Allyson N Trail
(74) *Attorney, Agent, or Firm*—Kelly Lowry & Kelley, LLP

(57) ABSTRACT

A radio frequency identification device includes an attachment means which is maintained in operative relationship with an object or individual by securement means. The attachment means is disposable and the securement means is easily separable therefrom for reuse, the securement means including a radio frequency identification (RFID) circuit which can be reused after the attachment means has been disposed of. One form of the radio frequency identification device is an identification wristband which incorporates attachment means and securement means for said attachment means, the securement means incorporating an RFID such as a chip which is removed from operative relationship with the attachment means when the securement means is removed to permit reuse of the securement means and chip.

18 Claims, 3 Drawing Sheets

IDENTIFICATION DEVICE HAVING REUSABLE TRANSPONDER

BACKGROUND OF THE INVENTION

This application claims the benefit of U.S. Provisional Application No. 60/040,962, filed Mar. 12, 1997. In addition, this application is a continuation-in-part of copending U.S. Ser. No. 09/033,832, filed Mar. 3, 1998.

This invention relates to radio frequency (RF) identification devices and, more particularly, to RF identification devices designed to permit the transmission of information about a person or thing to whom or which the RF identification devices are secured. The RF identification devices of the invention have particular application in the identification of individuals and the transmission of relevant information about said individuals to a master receiving and transmitting station whereby, when said master station addresses the RF identification devices on particular individuals, it will be able to ascertain various aspects of relevant data pertinent to the condition, situation, or other pertinent information about the individual.

Of course, a hand-held reader capable of receiving information from the identification device and, in certain instances, of transmitting information to the memory of the identification device for storage therein, can be used in substitution for the master station referred to hereinabove.

At the present time, identification devices such as wristbands or the like are widely used in hospitals to identify patients and to provide information regarding the patients. Such wristbands are also utilized in various other applications, including prisoner identification and crowd control. Initially such wristbands were confined to providing the bare minimum of the person or wearer's name and, possibly, in a medical application, the nature of the wearer's illness. Recently, such wristbands have been provided with encoded information in the form of bar codes or the like whereby considerable additional information about the wearer can be ascertained, including such relevant data as medication, patient condition, or the like when used in a medical application, or other types of information related to the wearer when the wristband is used in other applications.

In utilizing such wristbands, bar code readers are provided to appropriate authorized personnel, such as nursing or other staff members in a medical environment, to permit personnel to read the bar code information and provide an appropriate response, such as administering medication or performing various therapeutic measures when the wristband is used in a medical application.

While the use of bar codes or other encoded materials has constituted a considerable advance, once the bar code has been applied to the identification wristband, the alteration of the information on the wristband entails the substitution of a new wristband. In addition, because of physical space limitations, the information imparted by bar codes or the like is necessarily limited.

A possible solution which would overcome the limitations of identification wristband which are bar-coded or the like would be to provide an RF circuit in the wristband which would incorporate a semi-conductor circuit with logic memory, and wherein the RF circuit is connected to an antenna capable of receiving and transmitting information, so that authorized personnel having or carrying a transponder could query the RF circuit of the wristband to elicit a wide spectrum of information not presently available in conventional wristbands.

Unfortunately, available RF circuits are relatively expensive and, since conventional wristbands are disposable after use, such circuits would have to be discarded if they were integral components of the wristband.

SUMMARY OF THE INVENTION

An object of the invention is the provision of an RF identification device which includes attachment means for attaching the RF identification device on a person or object to be identified, and securement means for said attachment means whereby said attachment means is retained in operative relationship with said person or object. For instance, the attachment means can be in the form of a wristband and the wristband can be maintained in operative relationship with the wrist of the patient by securement means which holds the wristband on the person's wrist, ankle or the like.

The RF device or circuit is located in or carried by the securement means. Upon removal of the wristband from the associated person or object, the attachment means and securement means can be separated or disassembled for convenient and economical discarding of the attachment means. The securement means can be sterilized, if appropriate, and reused, thus permitting the reuse of the RF device or circuit carried thereby, with the consequent economies resulting from such reuse.

Another object of the invention is the provision of an RF identification device of the aforementioned character wherein said attachment means incorporates an antenna and said securement means incorporates a transponder operatively connected to said antenna for receiving and transmitting information relating to the person or thing on which said attachment means is retained by said securement means.

A further object of the invention is the provision of an RF identification device in which said attachment means is constituted by the strap of an identification wristband and said securement means maintains said strap in operative relationship with a person or object to be identified.

Another object of the invention is the provision of an identification wristband incorporating an RF identification device, said wristband having an attachment portion constituted by an elongated strap and a securement means for maintaining said attachment portion in operative relationship with an object or person to be identified, said strap incorporating an antenna and said securement means incorporating a transponder operatively connected to said antenna whereby said wristband can receive and transmit signals imparting information regarding said person or object.

A further object of the invention is the provision of a wristband of the aforementioned character wherein said securement means is demountably associated with said strap to permit said strap to be discarded and said securement means to be reused, thus permitting repeated utilization of said transponder in said securement means.

An additional object of the invention is the provision of a wristband of the aforementioned character wherein the securement means incorporates a complete RFID tag including the antenna so that the necessity for securing the RFID device to a separate antenna is eliminated.

Other objects and advantages of the invention will be apparent from the following specification and the accompanying drawings.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
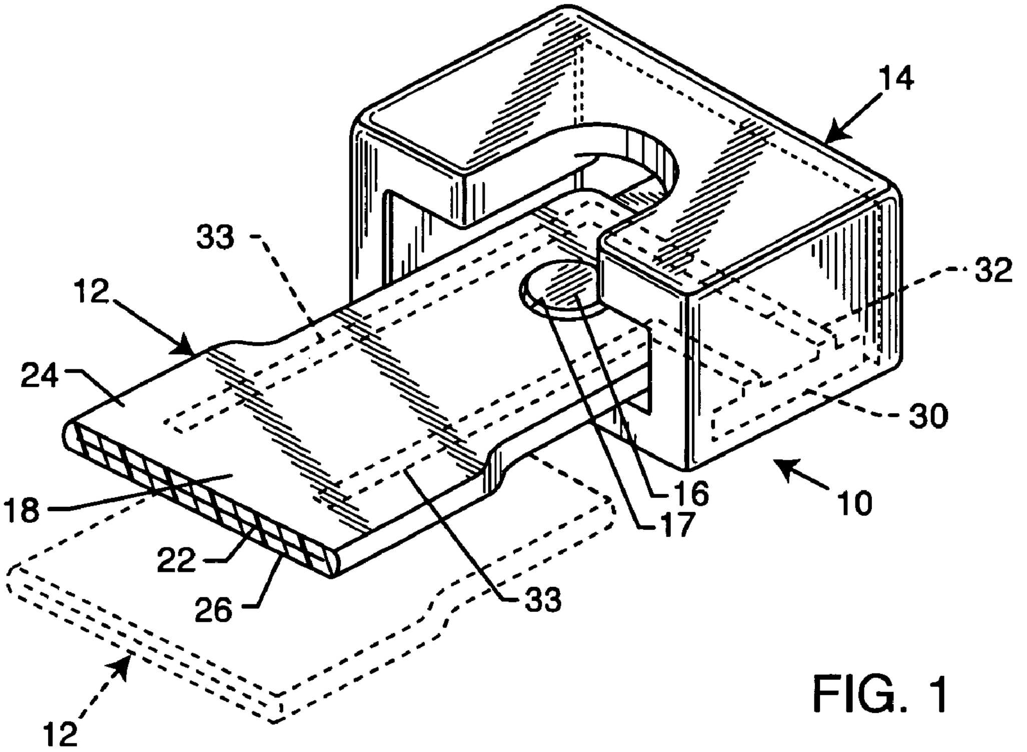
FIG. 1 is a partially sectional view of a wristband strap or body demountably connected to the securement means therefor.
Figure 2:
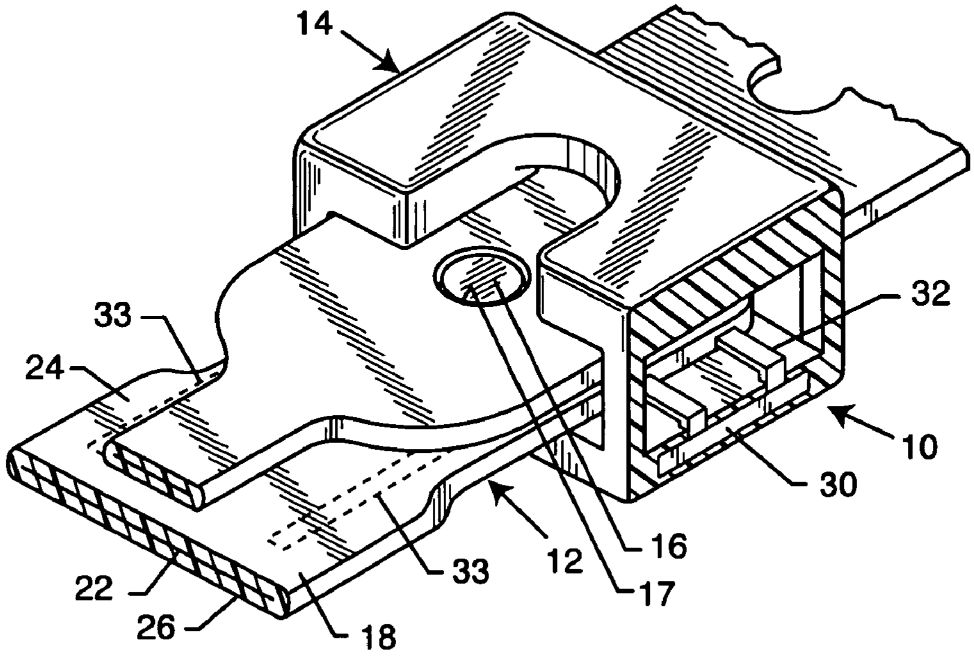
FIG. 2 is a partially sectional view of a wrist band strap and securement means with the strap portion secured by the securement means.

Referring to the drawings, and particularly to FIGS. 1-2 thereof, I show a portion of an identification wristband 10 which includes an attachment means 12 and a securement means 14. The securement means 14 is demountably secured to the attachment means 12 by a boss 16. The boss 16 has a slightly enlarged upper extremity which is larger than the mating opening 17 provided in the adjacent extremity of the wristband 10.

Therefore, the opening 17 in the wristband 10 can be forced over the slightly enlarged extremity of the boss 16 to hold the wristband in operative relationship with the securement means 14. However, when the use of the wristband by a patient or other person is finished, the wristband can be removed from operative relationship with the boss 16 by prying the extremity of the wristband 10 from operative engagement with the boss 16.

The attachment means is constituted by the strap or body portion 18 of the wristband 10, said body portion incorporating a space 22 between two laminae 24 and 26.

The structure and operation of the wristband 10 are more fully described in U.S. Pat. No. 5,479,797, which is incorporated by reference herein, the present description being limited to the incorporation in the securement means 14 of an RF circuit 30 shown in FIGS. 1 and 2 of the drawings. The securement means is fabricated by any suitable process from synthetic plastic material. For instance, high-density polyethylene can be used to fabricate the securement means 14 by the injection molding process with the boss 16 formed as an integral component thereof. During the injection molding process an IC chip 30 or RFID module is molded into the securement means 14.

Alternatively, a receptacle can be formed in the securement means 14 and the IC chip 30 or RFID module can be located in the receptacle for reuse in conjunction with the securement means 14.

Formed in the space 22 between the laminae 24 and 26, is an antenna 33 which can be electrically connected to the IC chip 30 by conductive bosses 32 engaging corresponding conductors, not shown, on the antenna 33. The antenna 33 can be fabricated in conjunction with the fabrication of the wristband 10 by various methods including foil strips, the use of conductive inks which may be formed from organic or polymeric materials, or conductive wires. The showing in FIG. 1 is not intended to indicate the requisite length of the antenna 33 since this is determined by the characteristics of the IC chip 30 or RFID module.

The conductive bosses 32 can be fabricated in any desirable configuration and are not limited to the buss configuration shown in the drawings. For instance, the conventional cylindrical contacts can be substituted for the buss bar configuration.

Consequently, the securement means 14 can be separated from the strap or body portion of the attachment means 12 by disengaging it from the boss 16. The strap or body portion 18 of the attachment means 12 can be discarded and the securement means 14 inclusive of the RF circuit component such as IC chip or RFID module can be re-sterilized and returned to a point of use. As one example, such point of use may comprise an admittance desk at a medical facility or the like. At such admittance desk, when a medical patient is admitted to the facility, the IC chip 30 or the like can be loaded or re-programmed with relevant data and associated with a new or replacement one of a plurality of interchangeable attachment means 12 (shown in dotted lines in FIG. 1) by forcing the opening, 17 in the replacement attachment means over the boss 16 of the re-sterilized and re-programmed securement means 14 to bring the contacts, not shown, of the antenna 33 into engagement with the corresponding contacts 32 of the IC chip or RFID module 30. Persons skilled in the art will recognize and appreciate that the invention is not confined to use in a medical facility environment or the like, but that a range of alternative uses including but not limited to crowd control are also contemplated.

Continued repeated usage of the securement means 14 and the re-programmable RF circuit component such as the IC chip 30 or the like materially reduces the per-person cost of the RF identification device 10. Although the use of an antenna 33 in conjunction with the RFID module 30 has been disclosed, it is to be understood that a self-contained RFID module can be utilized with said module incorporating its own antenna, thus eliminating the necessity for providing an antenna, such as the antenna 33 in the wristband 10.

Other than the conductive means between the antenna 33 and the chip 30, it is also possible to utilize the capacitative circuit disclosed in the co-pending application Ser. No. 60/040,143 filed Mar. 10, 1997, entitled REACTIVELY COUPLED ELEMENTS IN CIRCUITS ON FLEXIBLE SUBSTRATES, now U.S. Pat. No. 6,181,287, issued Jan. 30, 2001. The capacitative circuits of the two embodiments of that application can be applied with equal cogency to the RF circuit or chip 30.

Furthermore, the antenna 33 can also be incorporated in the securement means 14 if the design parameters of the circuitry permit.

Figure 3:
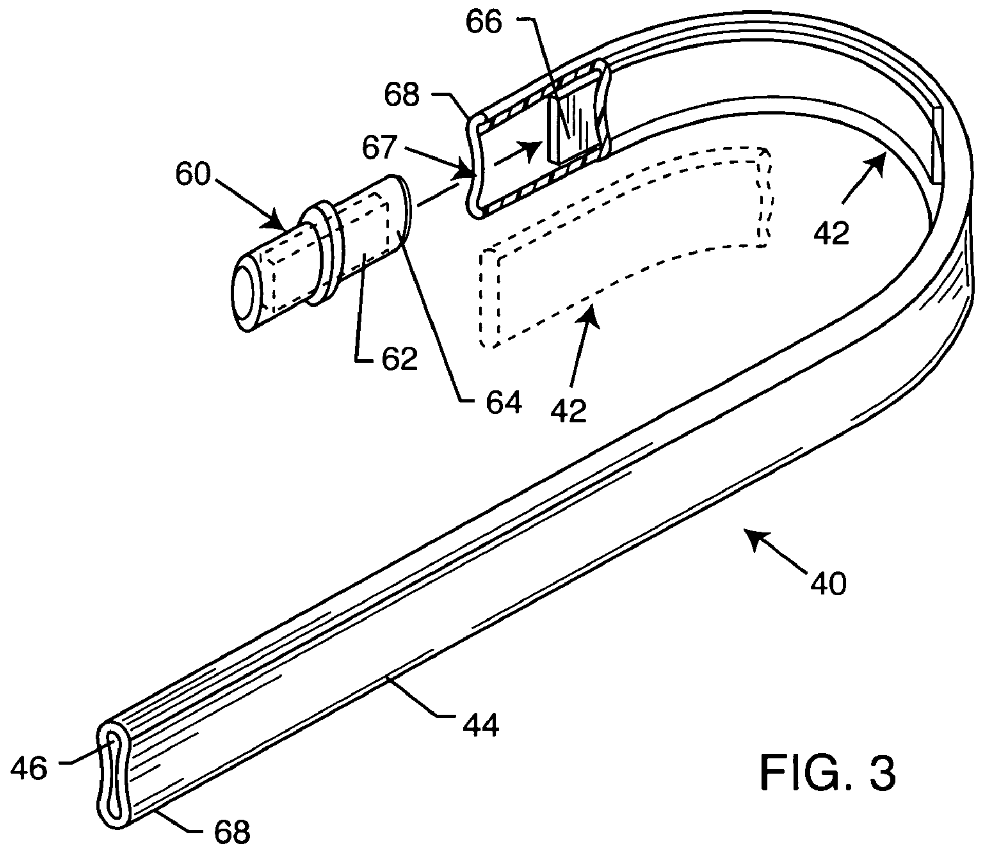
FIG. 3 is a view showing an alternative securement means and securement means construction.
Figure 4:
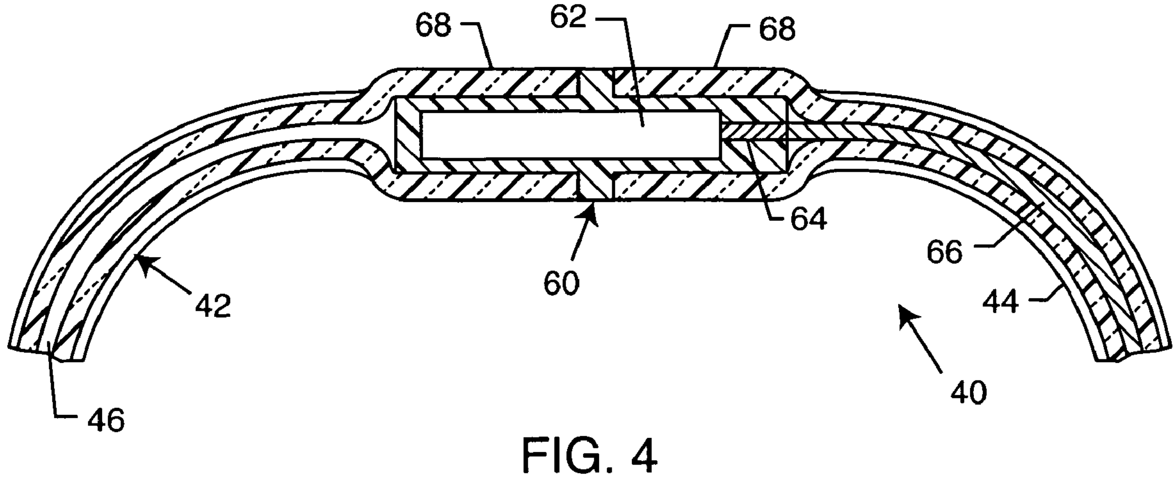
FIG. 4 is a sectional view of the securement means disposed in operative relationship with the extremities of the attachment means.

An alternative form of RFID is shown at 40 in FIGS. 3 and 4 of the drawings as including an attachment means 42 constituted by an elongated tubular strip or band 44 having an internal chamber 46 provided therein. The construction and mode of operation of the band 44 and the securement means 60 provided for usage therein are disclosed more fully in co-pending application Ser. No. 08/787,757, filed Jan. 28, 1997, entitled TUBULAR IDENTIFICATION WRISTBAND, now U.S. Pat. No. 5,740,623, issued Apr. 21, 1998, the disclosure of which is incorporated herein by reference.

The securement means 60 is fabricated from a suitable synthetic plastic and has an RF circuit component such as an RFID chip module 62 incorporated therein with a conductive contact or contacts 64 provided on the surface of the securement means 60 for engagement with one or more conductors of an antenna 66 located in the chamber 46 of the band or body 44.

The chip 62 is shown in FIGS. 3 and 4 of the drawings mounted within the securement means 60, with the opposite extremities 68 of the body 44 of the attachment means 42 secured or fitted on the opposite extremities of the securement means 60.

Where an antenna 66 is used, it is located in one extremity of the chamber 46 in the band or body 44, and that extremity is marked as indicated by reference numeral 67 in FIG. 3 at one or a first end thereof to indicate the location of the extremity 68 of the band or body 44 which incorporates the antenna. The antenna 66 can also be imprinted or otherwise applied to the wall of the chamber 46, if desired. The chip 62 is located internally of the securement means 60 and has a contact 64 engageable with a corresponding conductor, not shown, on the antenna 66.

Figure 5:
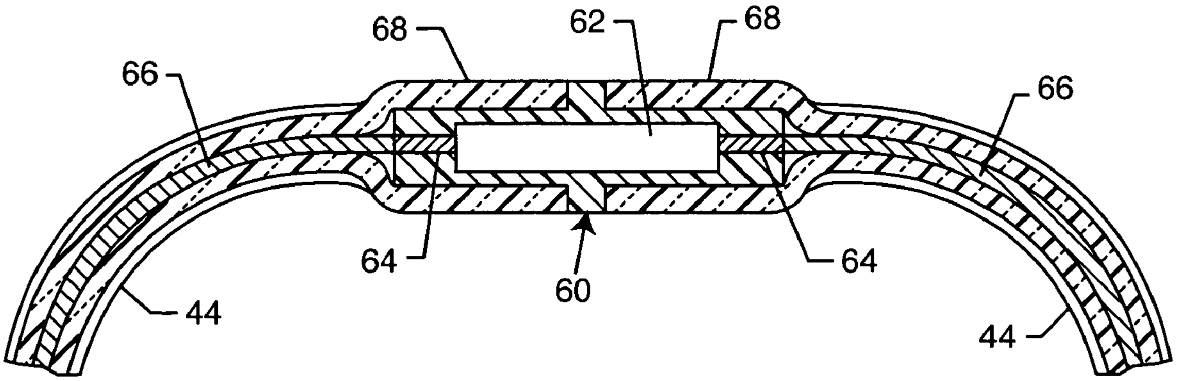
FIG. 5 is a sectional view similar to FIG. 4, but depicting a further alternative preferred form of the invention.

Alternatively, as viewed in FIG. 5, the band or body 44 may incorporate the antenna 66 to extend along the entire length thereof, so that opposite ends of the antenna 66 are exposed at both of the opposite end extremities of the band or body 44, for connection with an RFID chip or module 62 mounted on or within the securement means 60 by means of conductive contacts 64 at both ends of the securement means 60. In this configuration, appropriate operational coupling of the antenna 60 to the RFID chip or module 62 is achieved if and only if both ends of the antenna 66 are coupled to the RFID component 62. Accordingly, cutting of the band or body 44 will sever the antenna 66 and render the device inoperable. Similarly, the application of sufficient elongation stress to the wristband, as will typically occur in the event of an unauthorized attempts to remove the wristband from the authorized wearer, will cause at least one end of the antenna 66 to separate or uncouple from the RFID component 62, thereby again rendering the device inoperable.

In the embodiments of FIGS. 3-5, when the securement means 60 and the attachment means 42 are assembled in the manner shown, the chip 62 is electrically connected to the antenna 66 and the chip 62 and antenna can serve to receive and transmit signals in response to a suitably designed reader. At the conclusion of a normal or first use cycle, such as when a medical patient is discharged from a medical facility, the entire wristband or the like is removed from the wearer. The attachment means 42 inclusive of the band or body 44 is separated from the securement means 60 for convenient and economical disposal of said attachment means 42 for sanitary reasons. The securement means 60 can be sterilized (if appropriate) and reused for a second or subsequent use cycle in association with a new or replacement one of a plurality of interchangeable attachment means 42 (shown in dotted lines in FIG. 3) for mounting onto a second or subsequent wearer, with appropriate re-programming of the included RF circuit component such as the chip 62, thus achieving the economies incident to reuse of the chip 62.

In an alternative embodiment of the invention, a chip can be inserted in the internal chamber 46 of the tubular strip or band 44 of the attachment means 42. The chip can be associated with the identification card conventionally located in the chamber 46 as shown in the above-referenced application Ser. No. 08/787,757, filed Jan. 28, 1997. In an alternative embodiment, a complete RFID tag with antenna can be incorporated into securement means 60.

Moreover, it is also possible to incorporate an RFID chip in the pocket of pocket-style wristbands such as that disclosed in U.S. Pat. No. 5,581,924. After the wristband has been utilized, the chip can be removed from the pocket and the wristband discarded. The chip can be sterilized and re-used in the same manner as the chip of the previously-discussed embodiment of the invention.

The teachings of the invention relating to reuse of a significant component portion of an identification wristband or the like can be applied with equal cogency to a wide variety of devices to be attached to an object or person whose identity and other significant data must be detected for various reasons.

What is claimed is:

1. A radio frequency identification device, comprising:

attachment means including an elongated and disposable flexible first strap having first and second opposite ends and having a fastening opening in at least one of said ends;

securement means incorporating a fastening element engageable with said fastening opening of said first strap to removably connect said securement means thereto, and to configure said first strap generally in a closed loop configuration encircling and thus retained on a first object or individual to be identified;

a radio frequency identification circuit carried by said securement means and programmable for receiving and storing information associated with the first object or individual;

said securement means being removable from said first strap to accommodate removal of said first strap from the first object or individual for disposal, and, upon such removal, said fastening element of said securement means being thereupon engageable with a fastening opening of a second strap having first and second opposite ends, to removably connect said securement means thereto, and to configure said second strap generally in a closed loop configuration encircling and thus retained on a second object or individual to be identified;

said radio frequency identification circuit being re-programmable for receiving and storing information associated with said second object or individual;

said first and second straps each having an antenna; and coupling means for operatively and removably connecting said antenna with said radio frequency identification circuit when said securement means is connected respectively to said first or second strap, and for disconnecting said antenna from said radio frequency identification circuit when said securement means is respectively disconnected from said first or second strap.

2. The radio frequency identification device of claim 1, wherein said antenna on each of said first and second straps is formed from conductive ink.

3. The radio frequency identification device of claim 1, wherein said antenna on each of said first and second straps is formed from a material selected from the group including organic and polymeric materials.

4. The radio frequency identification device of claim 1, wherein said radio frequency identification circuit is embedded within said securement means.

5. The radio frequency identification device of claim 1, wherein said fastening opening in said first and second straps comprises at least a pair of fastening openings formed respectively at said first and second ends.

6. The radio frequency identification device of claim 5 wherein each of said first and second straps comprises an elongated tubular band.

7. A radio frequency identification device, comprising:

attachment means including an elongated and disposable flexible first strap having first and second opposite ends and having a fastening opening in at least one of said ends;

securement means incorporating a boss engageable with said fastening opening of said first strap to removably connect said securement means thereto, and to configure said first strap generally in a closed loop configuration encircling and thus retained on a first object or individual to be identified; and a radio frequency identification circuit carried by said securement means and programmable for receiving and storing information associated with the first object or individual;

said securement means being removable from said first strap to accommodate removal of said first strap from the first object or individual for disposal, and, upon such removal, said boss of said securement means being thereupon engageable with a fastening opening of a second strap having first and second opposite ends, to removably connect said securement means thereto, and to configure said second strap generally in a closed loop configuration encircling and thus retained on a second object or individual to be identified;

said radio frequency identification circuit being re-programmable for receiving and storing information associated with said second object or individual; and said securement means further defining an opening extending therethrough for slide-fit passage of said second end of said first and second straps for respectively configuring and retaining said first and second straps in a generally closed loop shape.

8. The radio frequency identification device of claim 7, wherein said second ends of said first and second straps are adjustably retained within the securement means.

9. A radio frequency identification device, comprising:

attachment means including an elongated and disposable flexible first strap having first and second opposite ends and having a pair of fastening openings formed respectively at said first and second ends;

securement means incorporating a fastening element engageable with said fastening opening of said first strap to removably connect said securement means thereto, and to configure said first strap generally in a closed loop configuration encircling and thus retained on a first object or individual to be identified; and a radio frequency identification circuit carried by said securement means and programmable for receiving and storing information associated with the first object or individual;

said securement means being removable from said first strap to accommodate removal of said first strap from the first object or individual for disposal, and, upon such removal, said fastening element of said securement means being thereupon engageable with a fastening opening of a second strap having first and second opposite ends and a pair of fastening openings formed respectively at said first and second ends, to removably connect said securement means thereto, and to configure said second strap generally in a closed loop configuration encircling and thus retained on a second object or individual to be identified;

said radio frequency identification circuit being re-programmable for receiving and storing information associated with said second object or individual; and said first and second straps each including an antenna carried generally at said first end thereof for operative connection with said radio frequency identification circuit when said first extremity of said securement means is received into the opening at said strap first end.

10. The radio frequency identification device of claim 9, wherein said first end of each of said first and second straps is marked to indicate the location of said antenna.

11. A radio frequency identification device, comprising:

attachment means including an elongated and disposable flexible first strap having first and second opposite ends and having a pair of fastening openings formed respectively at said first and second ends;

securement means incorporating a fastening element engageable with said fastening opening of said first strap to removably connect said securement means thereto, and to configure said first strap generally in a closed loop configuration encircling and thus retained on a first object or individual to be identified; and a radio frequency identification circuit carried by said securement means and programmable for receiving and storing information associated with the first object or individual;

said securement means being removable from said first strap to accommodate removal of said first strap from the first object or individual for disposal, and, upon such removal, said fastening element of said securement means being thereupon engageable with a fastening opening of a second strap having first and second opposite ends and a pair of fastening openings formed respectively at said first and second ends, to removably connect said securement means thereto, and to configure said second strap generally in a closed loop configuration encircling and thus retained on a second object or individual to be identified;

said radio frequency identification circuit being re-programmable for receiving and storing information associated with said second object or individual; and said first and second straps each including an antenna extending substantially the entire length thereof and defining opposite ends at said first and second strap ends for respective operative connection with said radio frequency identification circuit when said first and second extremities of said securement means are received respectively into the openings at said first and second strap ends.

12. A radio frequency identification method, comprising the steps of:

providing a plurality of elongated and disposable flexible straps for respective mounting onto a corresponding plurality of objects or individuals to be identified;

providing a securement means incorporating a radio frequency identification circuit programmable for receiving and storing information associated with any one of the plurality of objects or individuals to be identified;

removably connecting the securement means with a first one of the straps to configure and retain the first strap generally in a closed loop configuration encircling and thus retained on a first one of the objects or individuals to be identified for the duration of a first use cycle;

programming the radio frequency identification circuit with information associated with the first object or individual;

disconnecting the securement means from the first strap at the conclusion of said first use cycle to accommodate removal of the first strap from the first object or individual for disposal;

following said disconnecting step, removably connecting the securement means with a second one of the straps to configure and retain the second strap generally in a closed loop configuration encircling and thus retained on a second one of the objects or individuals to be identified for the duration of a second use cycle; and re-programming the radio frequency identification circuit with information associated with the second object or individual.

13. The method of claim 12, further including the step of embedding the radio frequency identification circuit within the securement means.

14. The method of claim 12, further including the steps of incorporating an antenna into each of the straps, and coupling the radio frequency identification circuit with the antenna upon respective connecting of the securement means with each of the straps, and disconnecting the radio frequency identification circuit from the antenna upon respective disconnecting of the securement means from each of the straps.

15. The method of claim 14, wherein each of the straps has a first end and a second end, and further including the steps of incorporating the antenna into each of the straps at the first end thereof, and marking the strap to indicate the location of the antenna.

16. The method of claim 14, wherein each of the straps has a first end and a second end, and wherein the antenna extends substantially the entire length thereof and defines opposite ends generally at the first and second strap ends, said coupling step comprising the step of operatively connecting the opposite ends of the antenna with the radio frequency identification circuit by coupling the first and second strap ends respectively with first and second opposite extremities of the securement means.

17. The method of claim 14, wherein the antenna on each of the straps is formed from conductive ink.

18. The method of claim 14, wherein the antenna on each of the straps is formed from a material selected from the group including organic and polymeric materials.

* * * * *